(12) United States Patent
McGriskin et al.

(10) Patent No.: US 10,683,050 B2
(45) Date of Patent: Jun. 16, 2020

(54) PROTECTOR

(71) Applicant: BOPWORX LIMITED, Lisnaskea (GB)

(72) Inventors: Paul Gerard McGriskin, Lisnaskea (GB); Ciara Anne McGriskin, Lisnaskea (GB); Cian Desmond O'Sullivan, Limerick (IE)

(73) Assignee: BOPWORX LIMITED, Lisnaskea (GB)

(*) Notice: Subject to any disclaimer, the term of this patent is extended or adjusted under 35 U.S.C. 154(b) by 115 days.

(21) Appl. No.: 15/751,198

(22) PCT Filed: Aug. 4, 2016

(86) PCT No.: PCT/GB2016/000144
§ 371 (c)(1),
(2) Date: Feb. 8, 2018

(87) PCT Pub. No.: WO2017/025703
PCT Pub. Date: Feb. 16, 2017

(65) Prior Publication Data
US 2018/0229794 A1    Aug. 16, 2018

(30) Foreign Application Priority Data

Aug. 11, 2015 (GB) .................................. 1514202.9

(51) Int. Cl.
*B62J 23/00* (2006.01)

(52) U.S. Cl.
CPC ....... *B62J 23/00* (2013.01); *B65D 2585/6862* (2013.01)

(58) Field of Classification Search
CPC ........................................................ B62J 23/00
USPC ....................................................... 280/304.3
See application file for complete search history.

(56) References Cited

U.S. PATENT DOCUMENTS

| 4,580,706 A | | 4/1986 | Jackson et al. | |
| 4,878,558 A | * | 11/1989 | Asakura | B62J 17/00 |
| | | | | 180/219 |
| 5,183,281 A | * | 2/1993 | Stephens | B62J 23/00 |
| | | | | 280/279 |
| 5,871,269 A | * | 2/1999 | Chien | A41D 13/01 |
| | | | | 362/253 |

(Continued)

FOREIGN PATENT DOCUMENTS

| CH | 685382 A5 * | 6/1995 | ............. B41F 16/00 |
| CN | 205396298 U * | 7/2016 | |
| GB | 533730 | 2/1941 | |

(Continued)

OTHER PUBLICATIONS

International Search Report issued in PCT/GB2016/000144 dated Oct. 18, 2016, 4 pages.

(Continued)

*Primary Examiner* — Jacob D Knutson
(74) *Attorney, Agent, or Firm* — RatnerPrestia

(57) ABSTRACT

A universal protector for a bicycle element made up of a shell for protecting the element and a fastener for fastening the shell to the element in which the shell includes a size adapting and adjusting structure to accommodate bicycle elements of different sizes thereby protecting the bicycle and vehicles during transport.

20 Claims, 16 Drawing Sheets

(56) References Cited

U.S. PATENT DOCUMENTS

2005/0009652 A1* 1/2005 Chen .................. B62J 23/00
                                                    474/144
2016/0137248 A1* 5/2016 Garrett ................ B62J 23/00
                                                    74/551.8

FOREIGN PATENT DOCUMENTS

| GB | 2377717 A | 1/2003 |
| GB | 2480438 A | 11/2011 |
| JP | S5947586 U | 3/1984 |
| JP | S6428392 U | 2/1989 |
| JP | 2004114880 A | 4/2004 |

OTHER PUBLICATIONS

International Written Opinion issued in PCT/GB2016/000144 dated Oct. 18, 2016, 6 pages.

* cited by examiner

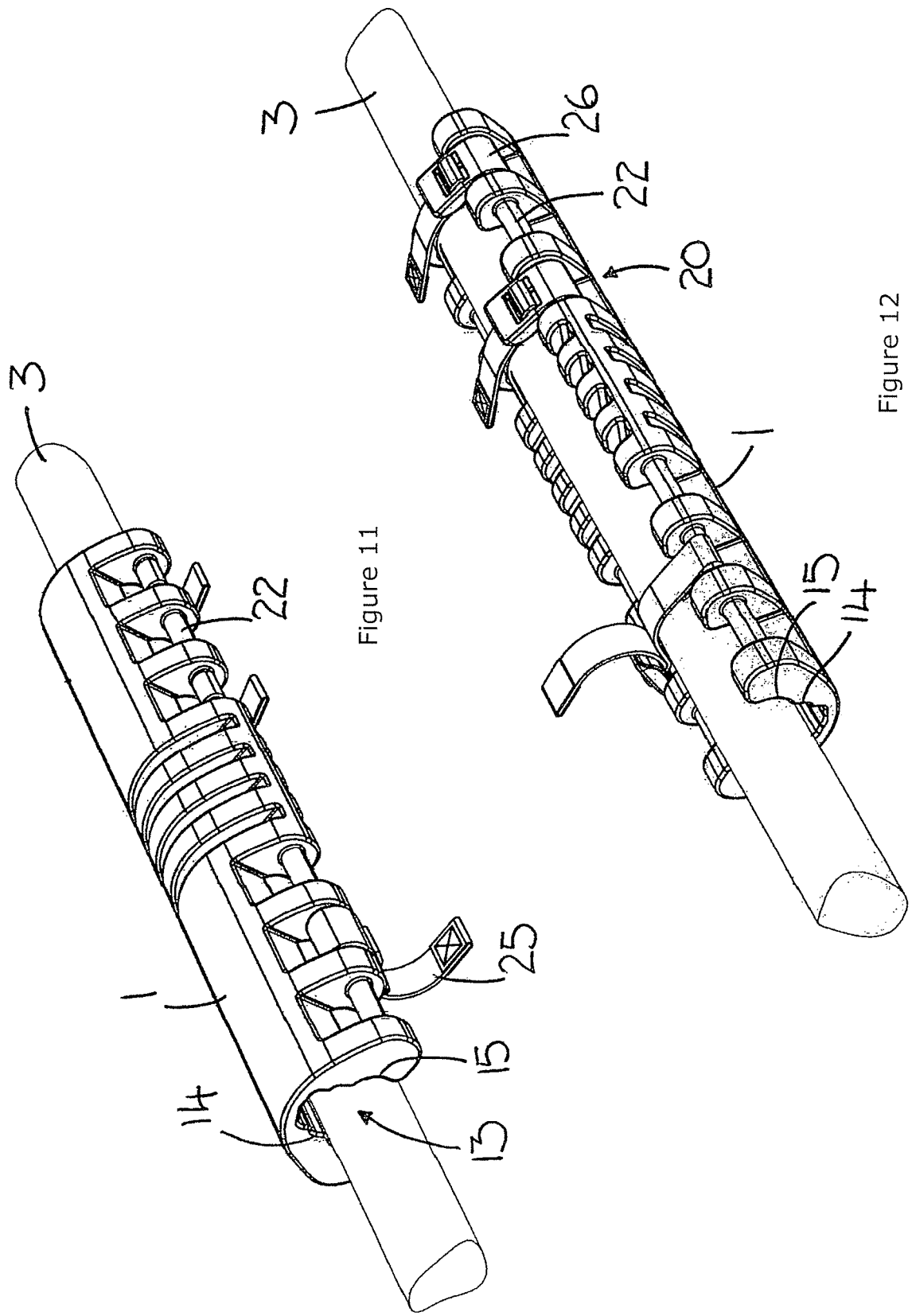

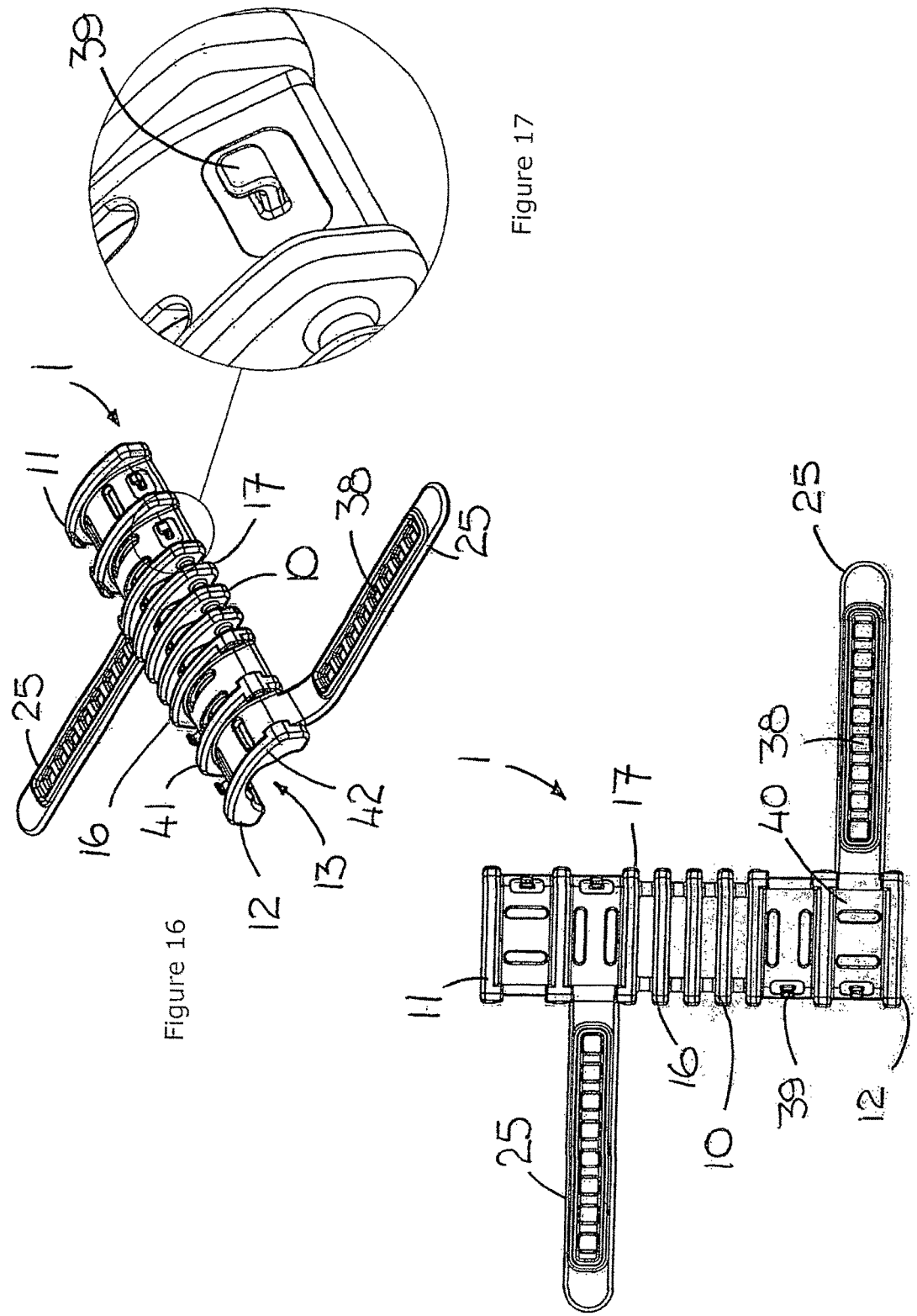

PROTECTOR

Cross-Reference to Related Applications

This application is the U.S. National Phase Application of PCT/GB2016/000144, filed Aug. 4, 2016, which claims priority to Great Britain Patent Application No. GB1514202.9, filed Aug. 11, 2015, the contents of such applications be incorporated by reference herein.

INTRODUCTION

This invention relates to a protector and more particularly to a universal protective wrap for bicycles.

BACKGROUND OF THE INVENTION

Modern bicycles have become increasingly sophisticated and can have highly engineered parts and elements which can be easily damage during transport and storage or when packaged. Moreover, profiled elements on bicycles such as the frames, pedals and handlebar grips can be damaged by bicycle racks during transport resulting in costly and unsightly impact damage to the bicycles. Similarly, bicycle pedals and the like can in turn damage vehicle paintwork.

To reduce such damage to bicycles and vehicles, it is known to place improvised covers over bicycle elements or parts. For example, it is known to place bags secured with string over pedals and to adhere various materials to frames. However, such improvised devices are in general cumbersome and time-consuming to secure to bicycles, can leave unsightly residues on the bicycles and can become worn or damaged following repeated use thus re-exposing the bicycle elements to damage.

SUMMARY OF THE INVENTION

According to the invention there is provided a universal protector for a bicycle element comprising:
a shell for protecting the element, and
a fastener for fastening the shell to the element wherein the shell comprises a size adapting and adjusting structure to accommodate bicycle elements of different sizes.

Preferably, the size adapting and adjusting structure comprises a groove in the shell. More preferably, the groove comprises at least a double groove.

Advantageously, the first groove of the double groove comprises a relatively narrower inner groove and the second groove of the double groove comprises a relatively wider outer groove.

Optionally, the groove comprises a third innermost groove.

Preferably, the groove comprises a generally C-shaped groove profile in cross-section.

Advantageously, the size adapting and adjusting structure comprises a hinge in the shell.

Preferably, the hinge comprises a centrally located hinge in the shell. More preferably, the hinge is formed by at least one rib in the shell.

Suitably, the fastener comprises a tie. Preferably, the tie is attached to the shell at a latch on the shell.

In one embodiment, the latch comprises a finger defined on the shell.

Alternatively, the tie is integral with the shell.

Suitably, the fastener comprises a buckle on the tie engageable with a hook on the shell.

Alternatively, the fastener comprises holes in the tie engageable with a hook on the shell.

Preferably, the tie further comprises a tidy for holding the free end of the tie. More preferably, the tidy comprises a hold-down fastener for the tie.

In one embodiment, the tidy is slidably mounted on the tie. In an alternative embodiment, the tidy is formed in the shell.

The universal protector of the invention is suitable for use with all bicycle elements generally requiring protection such as the bicycle frame (top tube, down tube etc.), fork, seat stay, pedal and handlebar grips etc. The universal protector is quick and easy to use and the size adapting and adjusting structure of the shell of the universal protector renders the universal protector suitable for use with bicycle elements of different sizes, shapes and profiles without requiring a user to adjust the protector. The universal protector is resilient and re-useable with ease while the fasteners of the protector are quick and easy to use.

The universal protector ensures that bicycles and vehicles in or on which bicycles are transported are protected from damage when loading and unloading bicycles and during transit.

BRIEF DESCRIPTION OF THE DRAWINGS

The invention will now be described, by way of example only, with reference to the accompanying drawings in which:

FIG. 11 is a perspective view from above and one side of a second embodiment of a universal bicycle protector of the invention on a profiled element of a bicycle in which the universal protector is provided with a third elongate innermost groove in the C-shaped profile of the universal protector for assisting in flexing of the universal protector about the profiled element of the bicycle;

FIG. 12 is a perspective view from below and one side of the universal bicycle protector of FIG. 11;

FIG. 16 is a perspective view from above and one side of a fourth embodiment of the universal protector of the invention in which the ties of the fastener are integral with the sleeve-like shell and extend laterally from the shell, the ties being provided with holes for engaging a complementary hook on the shell, with the tidy for the tie in the form of a groove defined on the shell;

FIG. 17 is an enlarged perspective view from above and one side of the junction of the tie, hook and shell of FIG. 16;

FIG. 18 is a top plan view of the universal protector of FIG. 16;

DETAILED DESCRIPTION OF THE INVENTION

Figure 1:
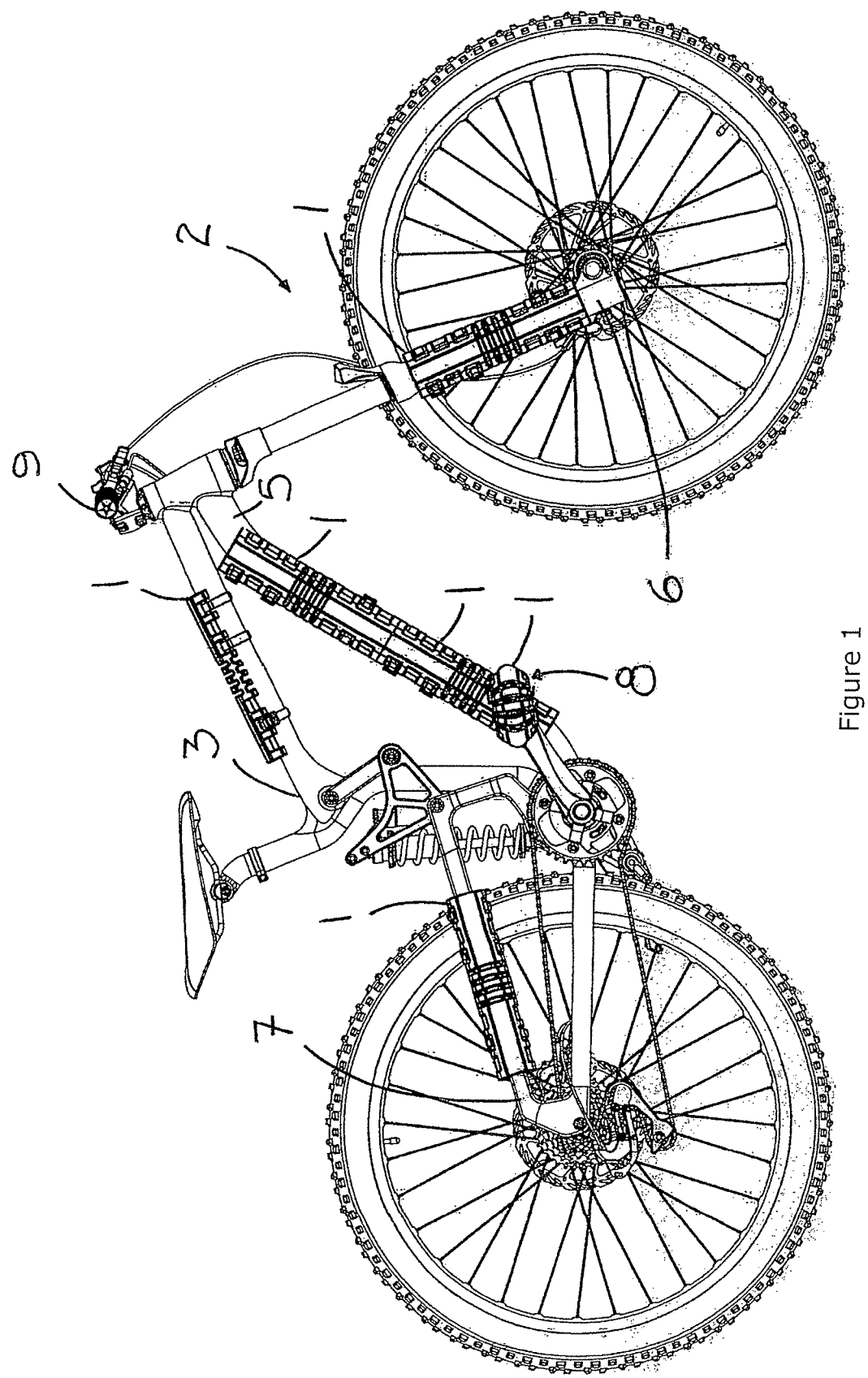
FIG. 1 is a perspective view from one side of a bicycle fitted with universal bicycle protectors of the invention on profiled elements of the bicycle including the top tube, down tube and seat stay of the bicycle frame, the bicycle fork and the pedal to protect the profiled elements from damage.
Figure 2:
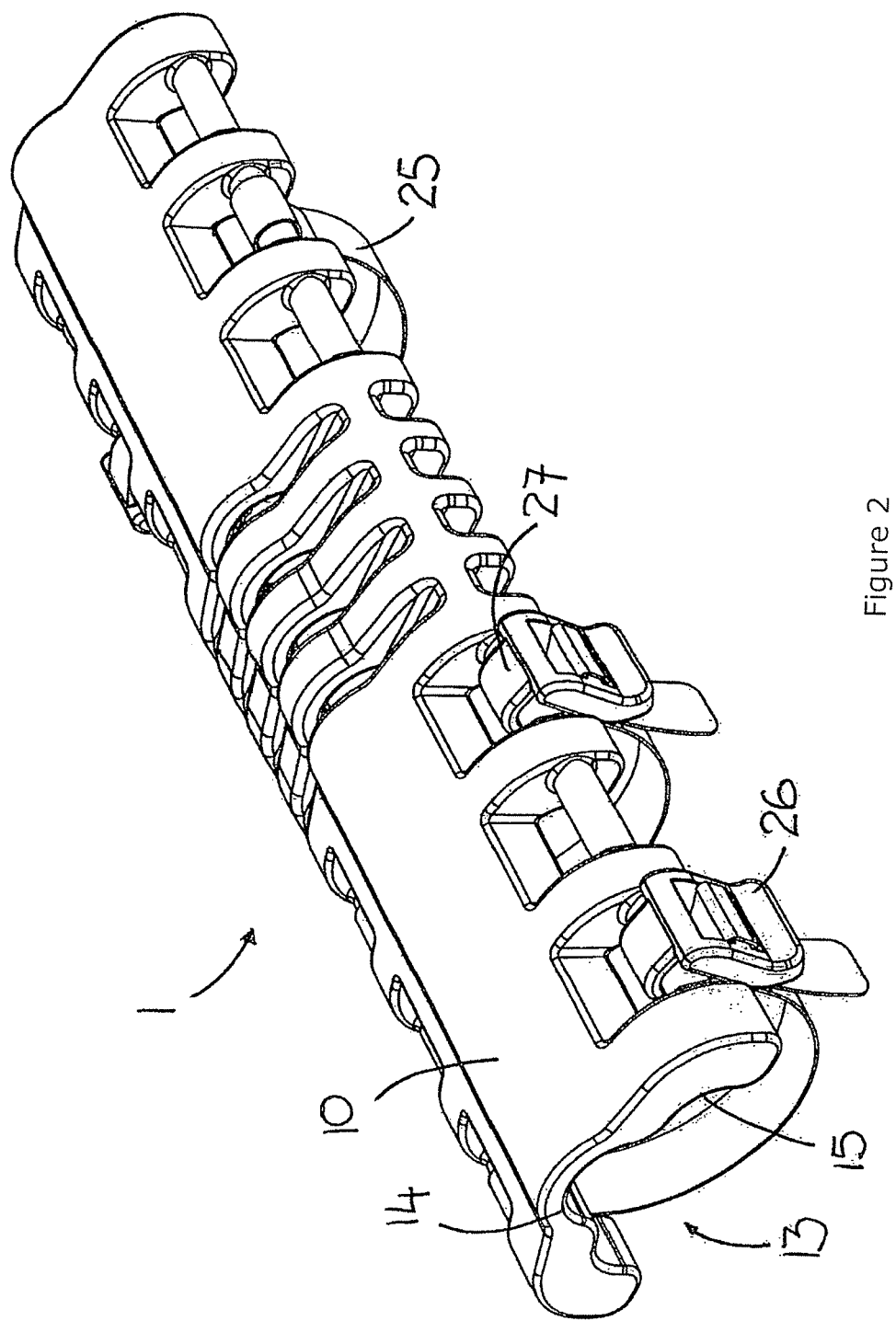
FIG. 2 is an enlarged perspective view from below and one side of the sleeve-like conformable universal protector of FIG. 1.
Figure 3:
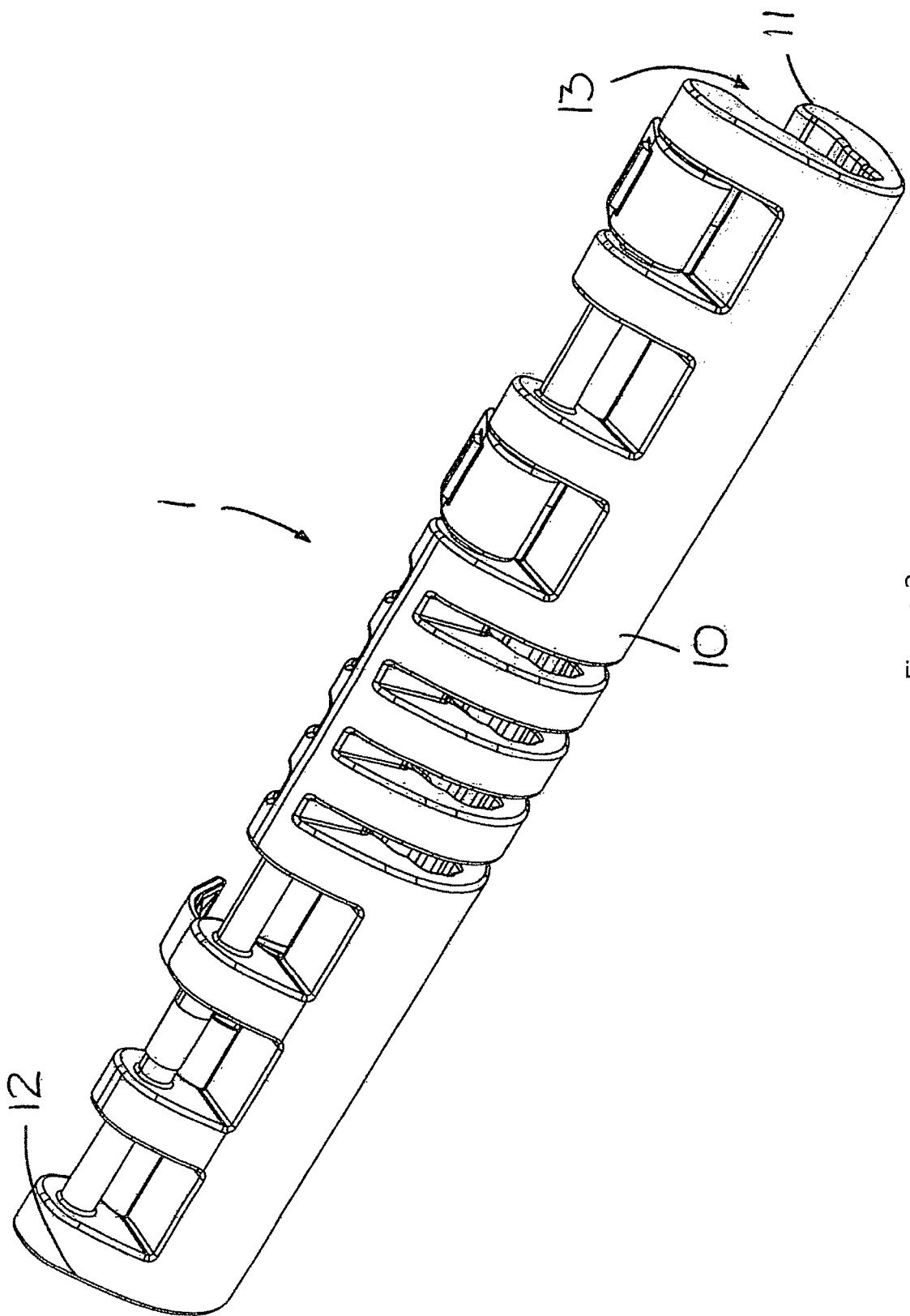
FIG. 3 is an enlarged perspective view from above and one side of the universal protector of FIG. 2.

FIGS. 1 to 10 of the accompanying drawings show a wrap-like protector 1 adapted to universally fit and protect the various profiled elements of a bicycle 2 namely, inter alia, the frame 3 (for example, the top tube 4 and the down tube 5), the fork 6, the seat stay 7, the pedal 8 and handlebar grip 9. As shall be explained more fully below, the protector 1 is deformable and profiled to conform to the profiled elements 3,4,5,6,7,8,9 to protect the profiled elements 3,4,5,6,7,8,9 and items placed against the profiled elements 3,4,5,6,7,8,9 such as vehicle bodywork from damage during transport or storage.

The protector 1 is made up of an elongate web- or sleeve-like conformable shell 10, generally C-shaped profile in cross-section, which can wrap around the profiled elements 3,4,5,6,7,8,9. The elongate C-shaped shell 10 has a first end 11, a second end 12 and a groove-like hollow 13 extending between the first end 11 and second end 12 for receiving the profiled elements 3,4,5,6,7,8,9. The groove-like hollow 13 is generally C-shaped in cross-section and is contoured to define a double groove in the form of an inner relatively smaller or narrower groove 14 in the shell 10 and an outer relatively larger or wider groove 15 in the shell 10 so that the universal protector 1 can size adapt to provide a universal fit to profiled elements 3,4,5,6,7,8,9 of various thicknesses i.e. the relatively narrower groove 14 and relatively wider groove 15 in the groove-like hollow 13 define a size adjusting or adapting structure to universally accommodate profiled elements 3,4,5,6,7,8,9 of various sizes in the protector 1.

The shell 10 has a top edge 16 and an oppositely disposed bottom edge 17 while a centrally located fold-like hinge 18 between the first end 11 and the second end 12 about which the elongate shell 10 of the universal protector 1 can bend, articulate and deflect extends between the top edge 16 and the bottom edge 17. The fold or hinge 18 is defined in the shell 10 by a series of alternating ribs and spaces or slots 19 between the top edge 16 and the bottom edge 17. The hinge 18 therefore also contributes towards the size adapting and adjusting structure of the protector 1.

The protector 1 is further provided with fasteners 20, 21 either side respectively of the centrally located hinge 18 for fastening the universal protector 1 to the bicycle 2. The fasteners 20,21 are located at the top and bottom edges 16,17 respectively of the shell 10 and are made up of top and bottom series 22,23 respectively of top and bottom individual finger-like latches 24 disposed towards the top and bottom edges 16,17 of the shell 10 which can engage strap- or belt-like ties 25 provided with buckles 26 at one end thereof for holding the ties 25 in a belt-like manner. Each buckle 26 is provided with a hook 27 for hooking to the finger-like latches 24 while the opposite end of each tie 25 can be secured to a finger-like latch 24 on an opposite edge 16,17 of the shell 10 e.g. with adhesives or by way of a sewn seam on the tie. As shown particularly, in FIGS. 6 and 7, the ties 25 are looped through the buckles 26 in conventional manner and are pulled to tighten the grip of the ties 25 about the top tube 4. The grip can be loosened by releasing or loosening the ties 25 in the buckles 26.

FIGS. 11 and 12 show a second embodiment of a universal bicycle protector 1 of the invention on the frame 3 of a bicycle 2 in which the universal protector 1 is broadly similar to the universal protector 1 of FIGS. 1 to 10. Like numerals indicate like parts. However, in the present embodiment, the groove-like hollow 13 of the universal protector 1 is provided with a third elongate innermost groove 28 in the C-shaped profile so that the inner smaller groove constitutes an intermediate groove 14 in the present embodiment. The innermost groove 28 serves to reduce the thickness of the shell 10 to assist and enhance flexing of the universal protector 1 on the frame 3 of the bicycle 2.

FIGS. 13(a) to 13(c) and FIGS. 14 and 15 show a third embodiment of the universal protector 1 of the invention broadly similar to the universal protector of FIGS. 1 to 12 but in which the belt-like tie 25 is provided with a belt/tie loop or tidy 29 on the tie 25 for holding the free end of the tie 25 in use. Like numerals indicate like parts. The tidy 29 serves to prevent the free end of the tie from projecting from the universal protector 1 in use (i.e. serves to hold the free end of the tie in a neat non-loose arrangement) and is made up of a substantially U-shaped tidy body 30 provided with a central transverse slot 31 for sliding the tidy 29 over the tie 25 and first and second upstanding sidewalls 32,33 either side of the transverse slot 31. The sidewalls 32,33 define a hold-down fastener 34 for holding down the free end of the tie 25 in use. More particularly, the hold-down fastener 34 is defined between the walls 32,33 and the body 30 of the tidy 29 above the slot 31 and is made up of a duct-like opening 35 for receiving the tie 25. The duct-like opening 35 is sized to receive the free end of the tie 25 while the upstanding sidewalls 32,33 are further provided with overhanging ribs 36,37 respectively to prevent the free end of the tie 25 from exiting the hold-down fastener 34. The free end of the tie 25 is held in place in the hold-down fastener 34 by simply urging the tie 25 between the upstanding walls 32,33.

FIGS. 16 to 21 show a fourth embodiment of the universal protector 1 of the invention in which the ties 25 of the fasteners 20 are integral with the sleeve-like shell 10 and extend laterally from the shell 10—i.e. the need for the finger-like latches 24 for securing the ties 25 to the shell 10 is dispensed with as the ties 25 are integral and contiguous with the shell 10. Like numerals indicate like parts. As shown in the drawings, in the present embodiment, the ties 25 are strap- or belt-like in construction and are provided with holes 38 for engagement with a hook 39 on the shell 10 insertable in the holes 38. More particularly, each tie 25 extends from the top edge 16 or the bottom edge 17 of the shell 10 at a first end thereof and is engageable via the holes 38 with an oppositely disposed hook 39 provided on the opposite top edge 16 or bottom edge 17 of the shell 10. In the present embodiment, the tidy 29 is provided in the form of a tie receiving channel 40 defined on the shell 10 between the top edge 16 and the bottom edge 17. The tie receiving channel 40 is broadly similar in structure and function to the tidy 29 of FIGS. 14 to 16 and is made up of a hold-down fastener 34 defined between first and second upstanding sidewalls 41,42 on the shell 10 to define the channel 40. Each sidewall 41,42 is provided with an overhang 43 at its free end (similar in function to the ribs 36,37 of FIGS. 14 to 16) to hold the tie 25 in the tidy 29 as previously described.

Figure 4:
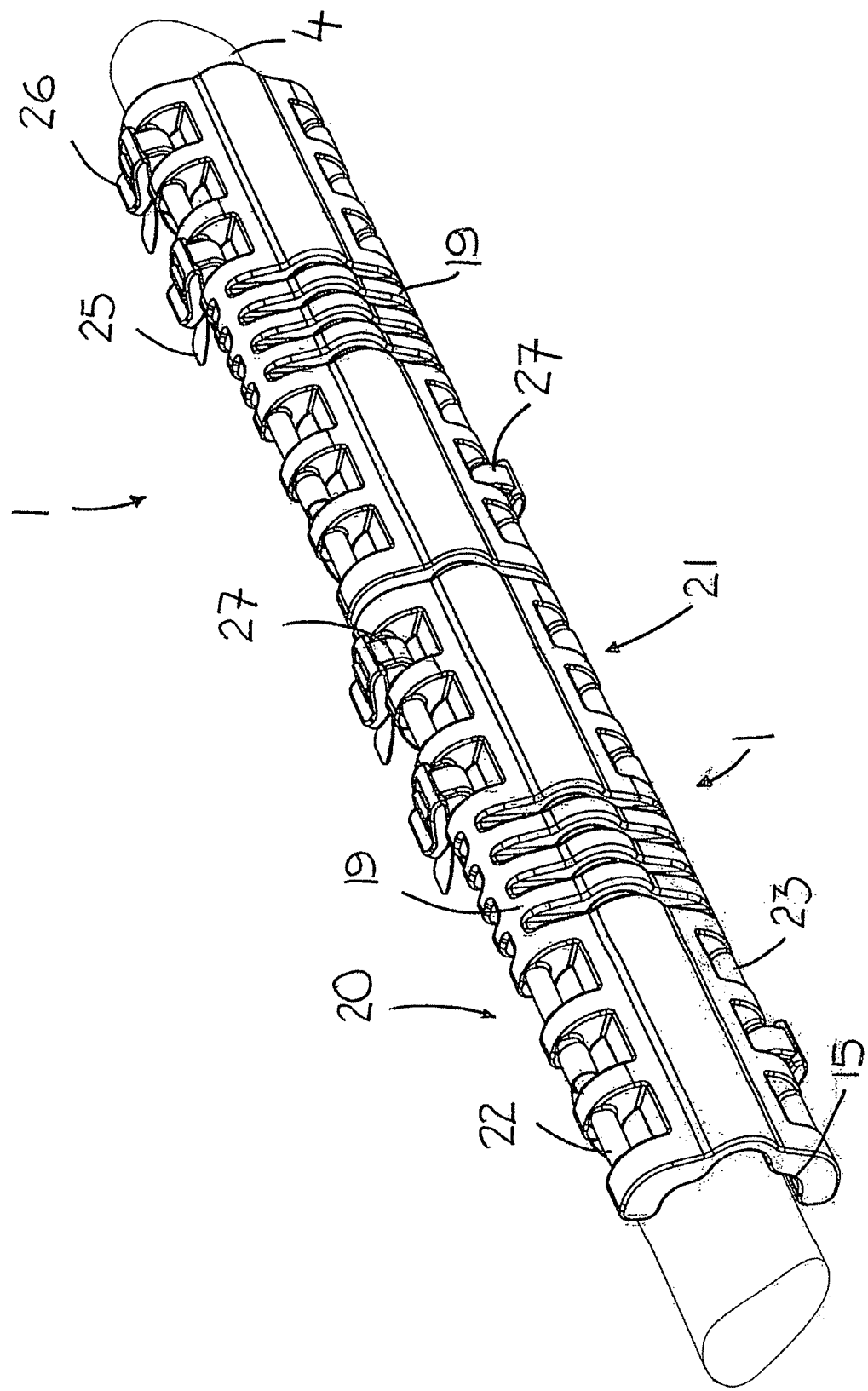
FIG. 4 is an enlarged perspective view from above and one side of a pair of universal protectors fastened side-by-side to the top tube of the bicycle frame of FIG. 1.
Figure 5:
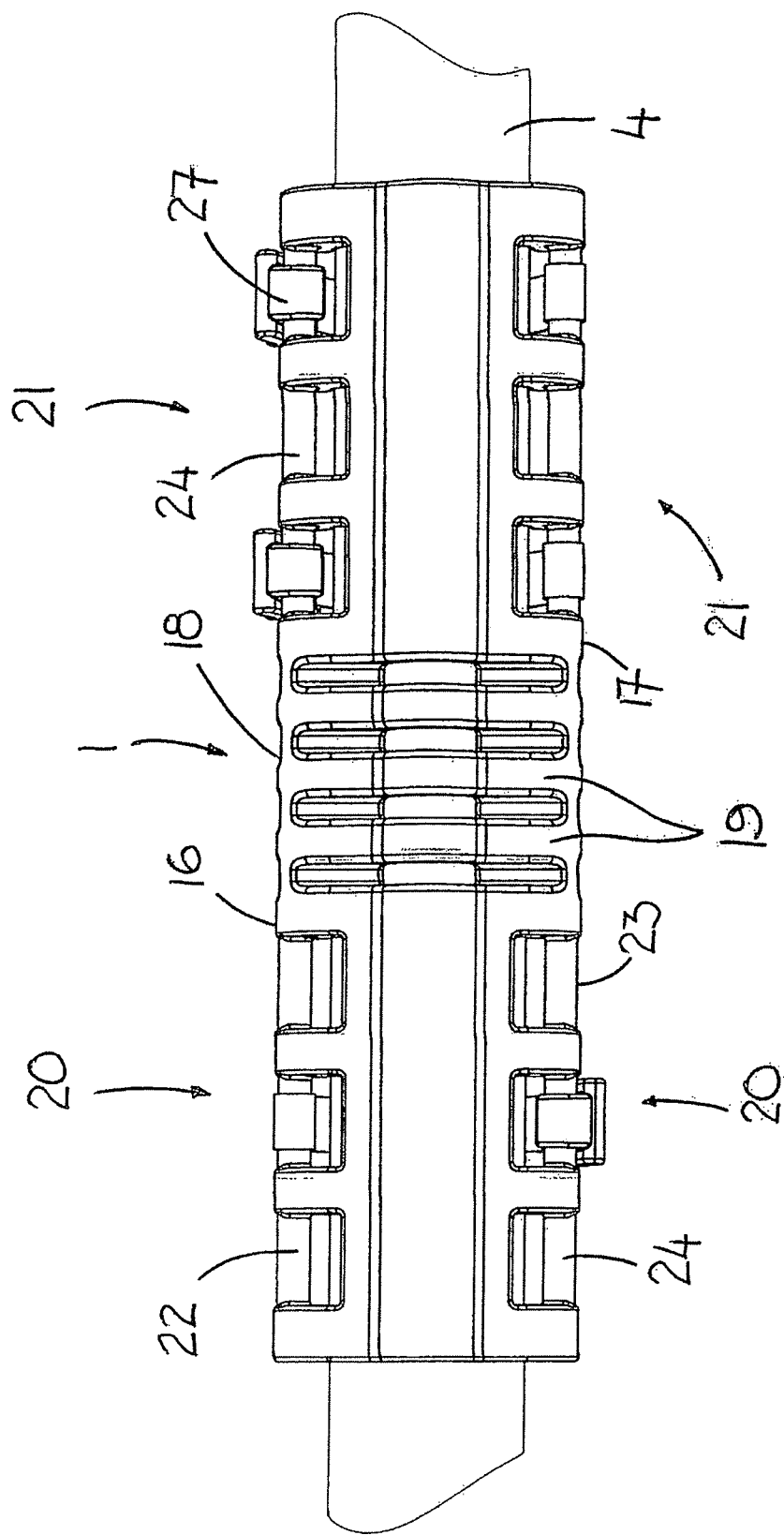
FIG. 5 is a front perspective view of the universal protector of FIG. 4.
Figure 6:
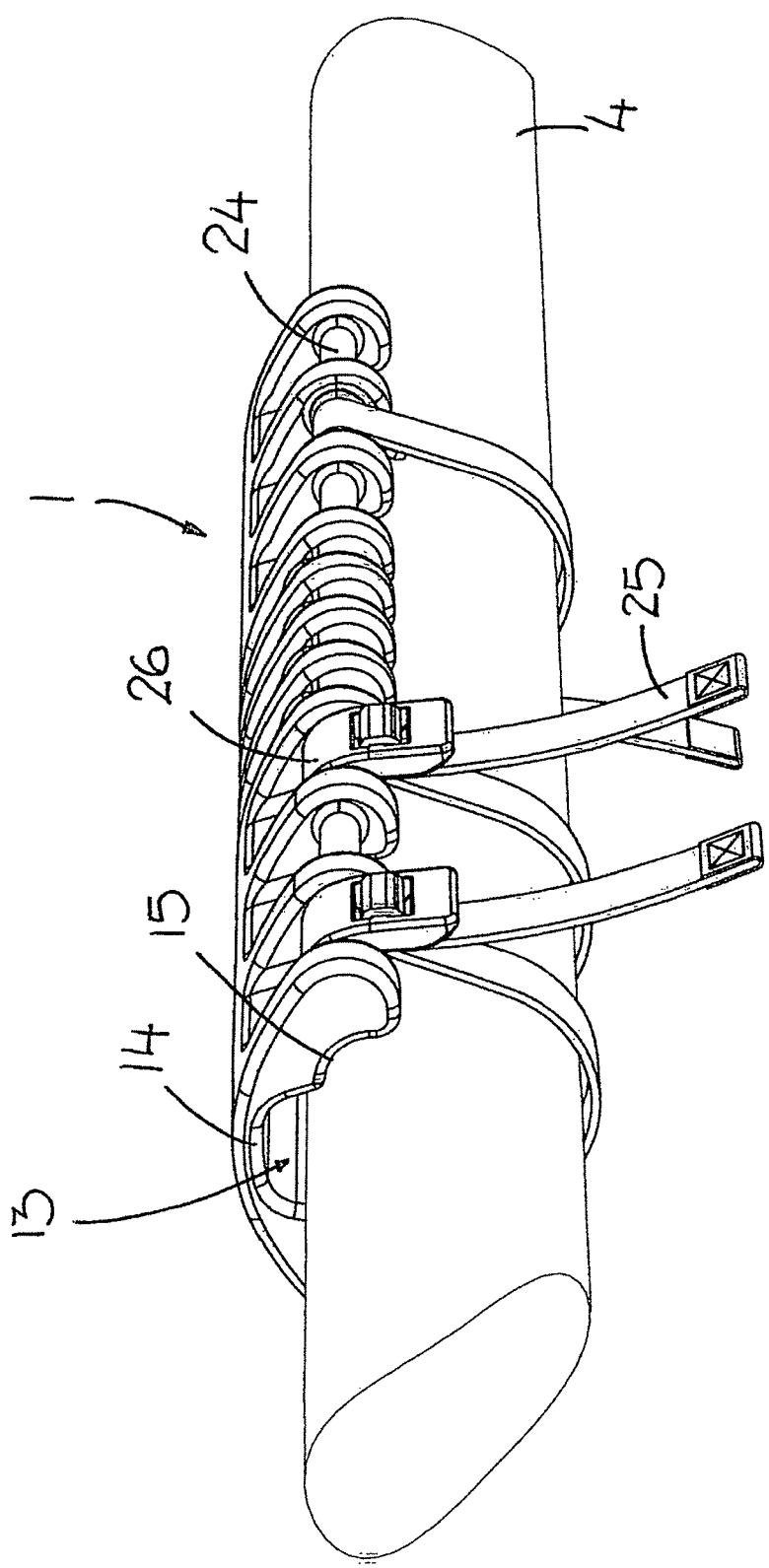
FIG. 6 is a further enlarged perspective view from below and one side of the universal protector fastened to the top tube with the ties.
Figure 7:
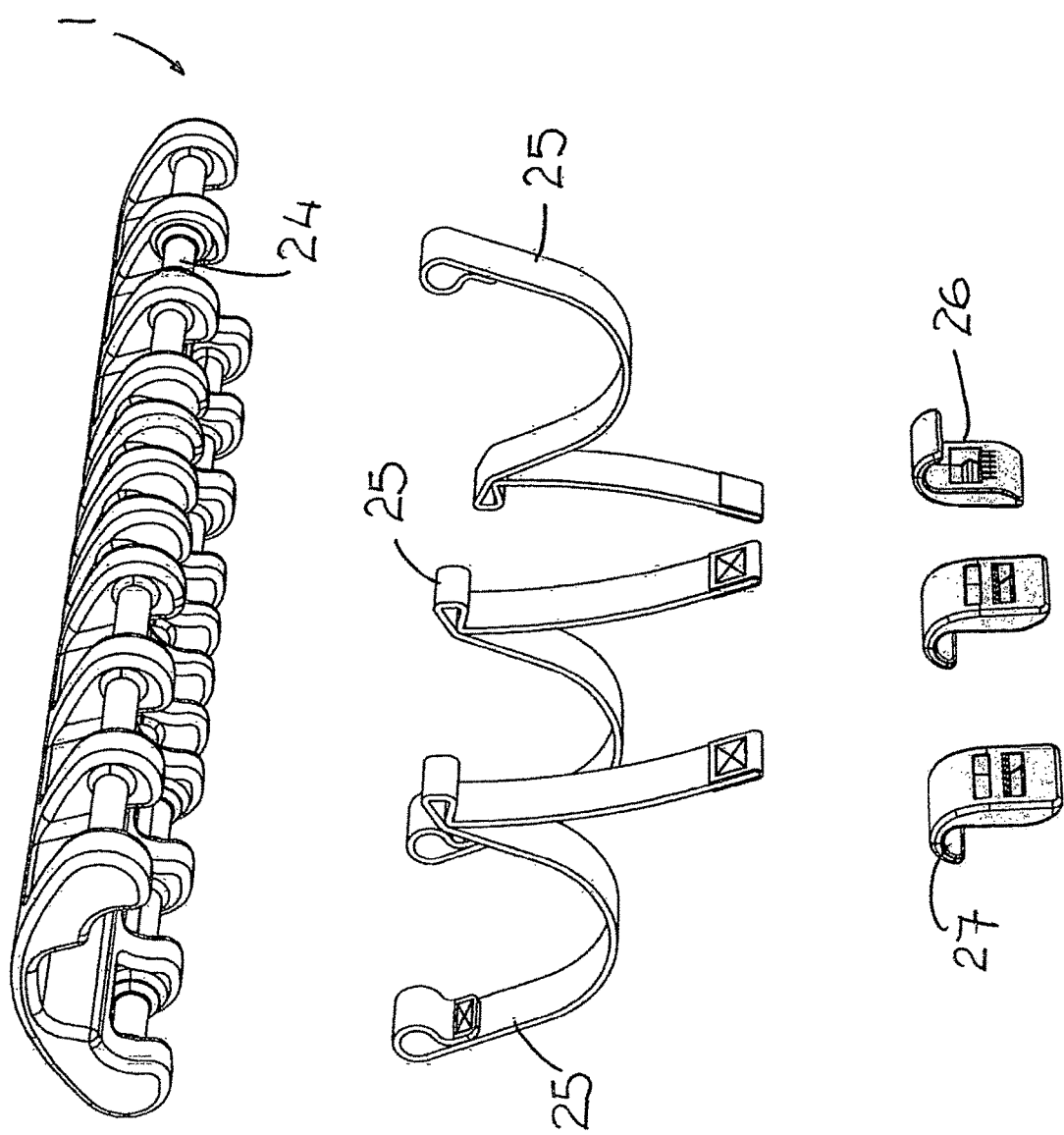
FIG. 7 is an exploded perspective view from below and one side of the universal protector with fasteners of FIG. 6 with the top tube removed and the ties separated from the "buckles" for clarity.
Figure 8:
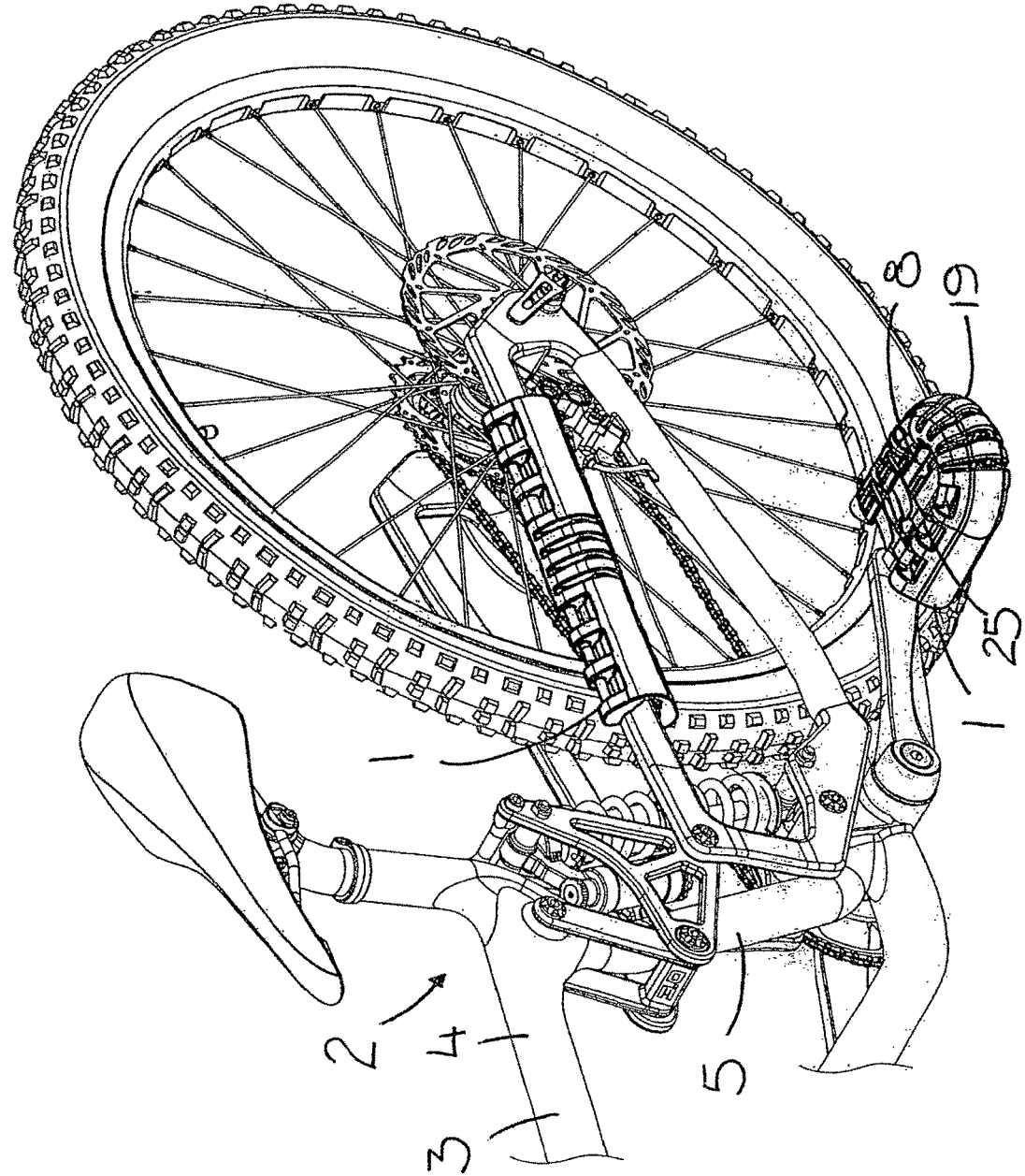
FIG. 8 is an enlarged perspective view from above and one side of the universal protector fastened to the seat stay and pedal of the bicycle.
Figure 9:
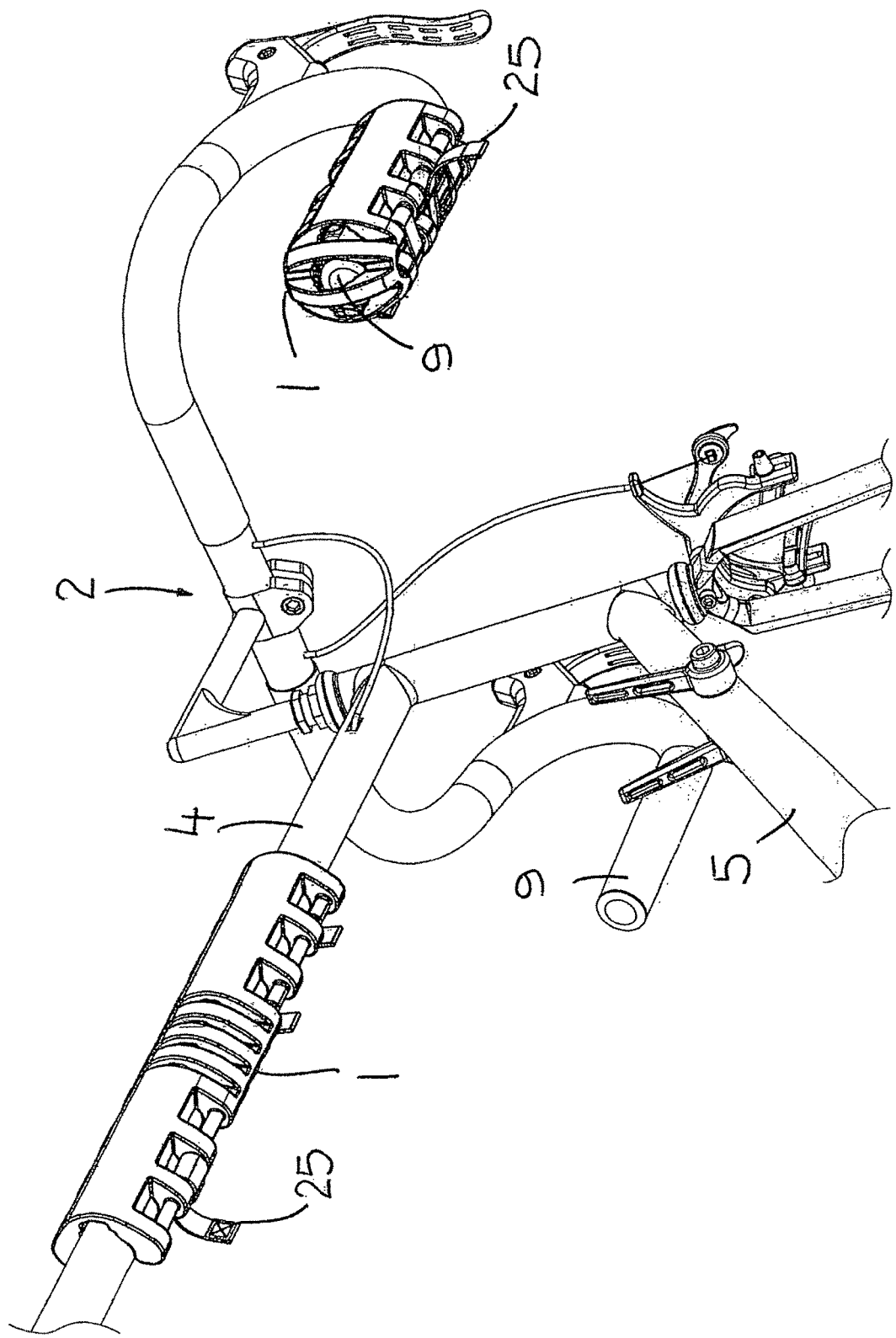
FIG. 9 is a perspective view from below of the universal protector fastened to the top tube and handlebar grip of the bicycle.
Figure 10:
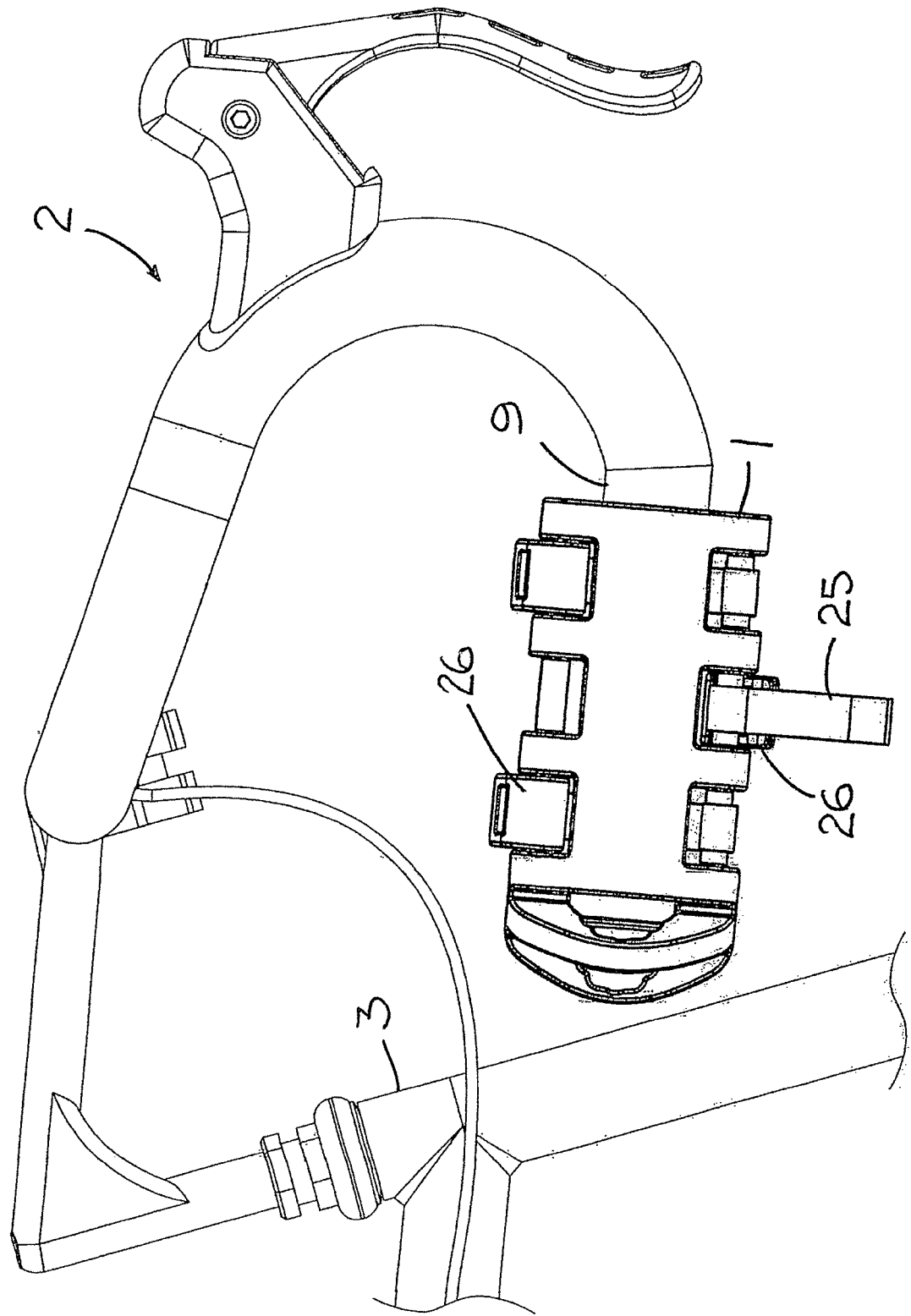
FIG. 10 is a further enlarged side perspective view of the universal protector on the handlebar grip of FIG. 9.
Figure 13A:
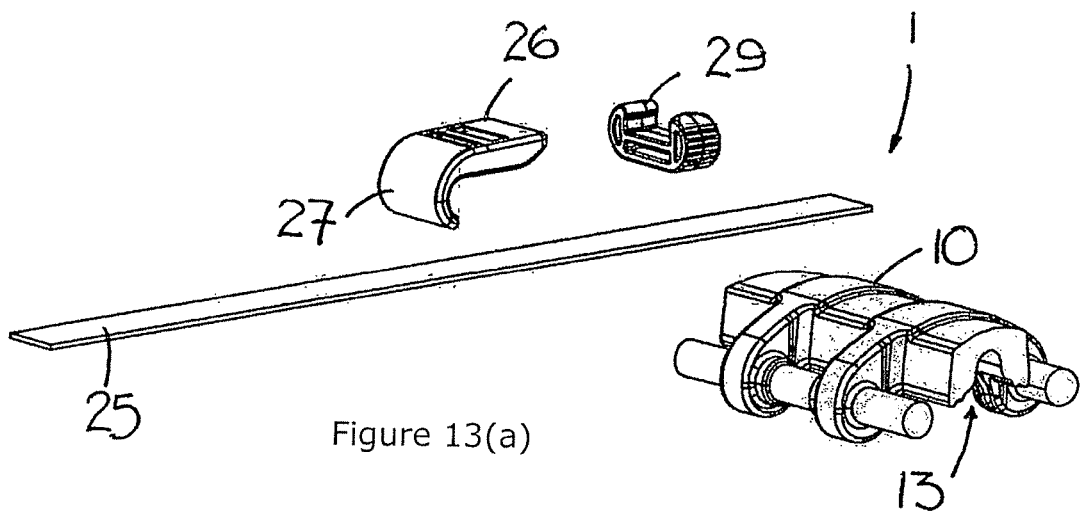
FIGS. 13(a) to 13(c) are perspective views from above and one side of a portion of a third embodiment of the universal protector of the invention in which the belt-like tie is provided with a belt loop or tidy on the tie for holding the free end of the tie in use with the movement of the free end of the tie towards the tidy shown sequentially.
Figure 13B:
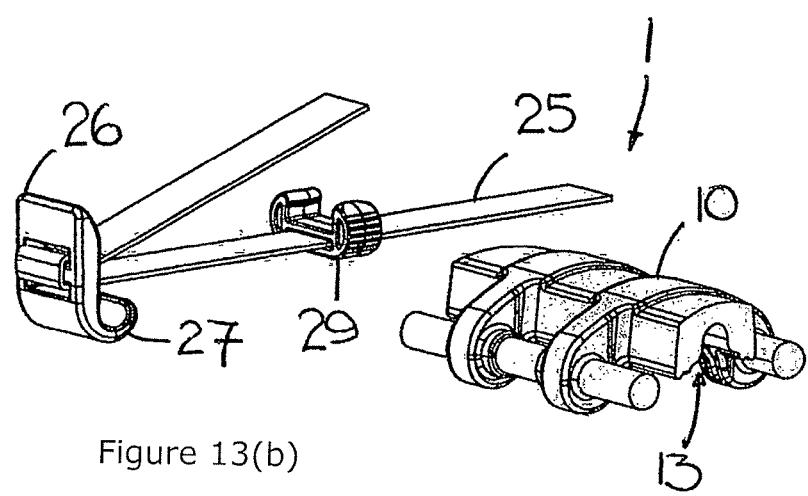
Figure 13C:
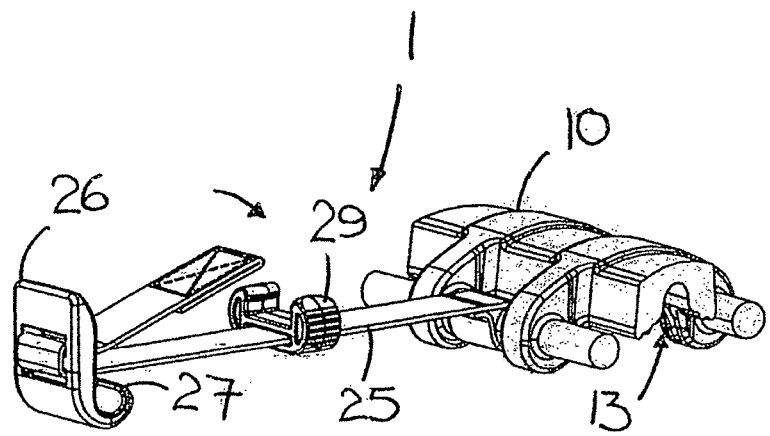
Figure 14:
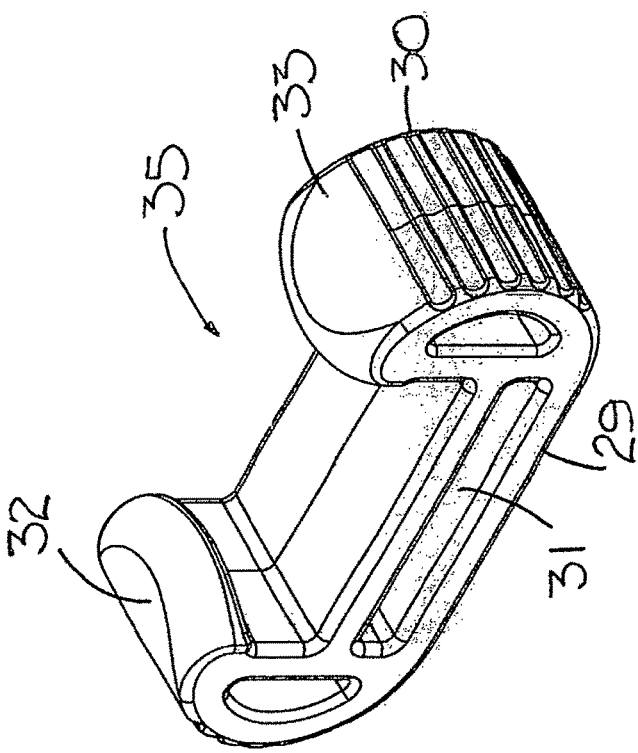
FIG. 14 is an enlarged perspective view from above and one side of the tidy of FIGS. 13(a) to 13(c)
Figure 15:
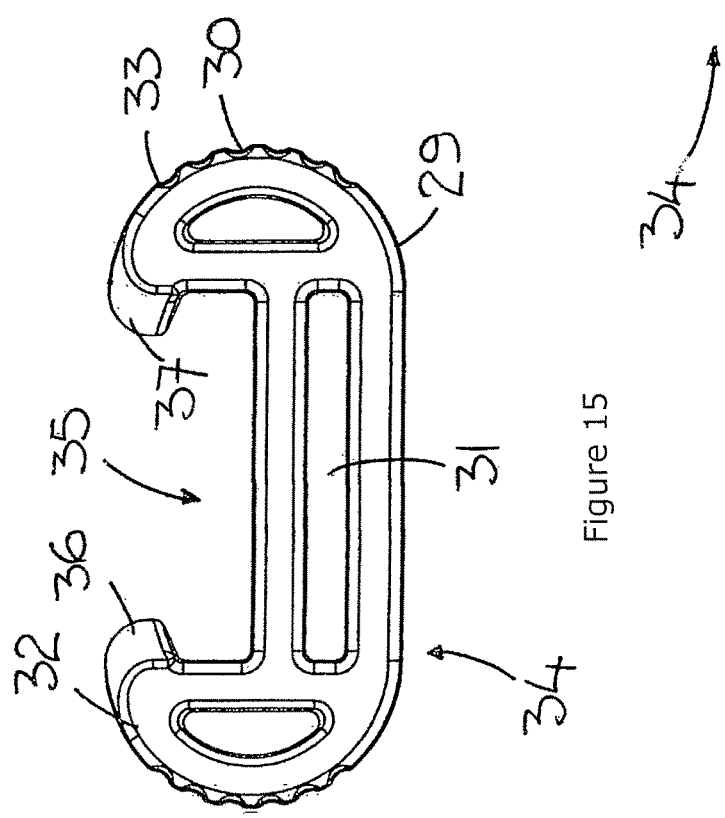
FIG. 15 is a front perspective view of the tidy.
Figure 19C:
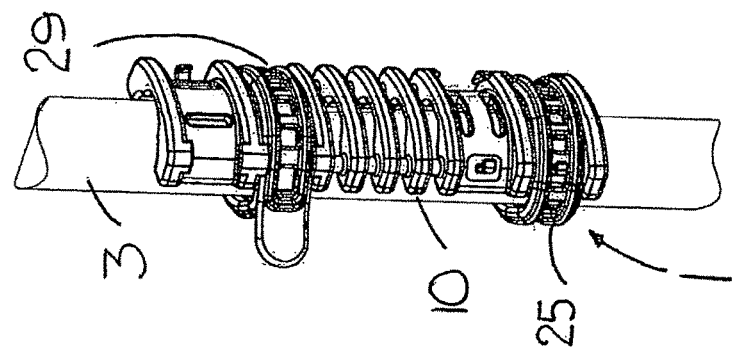
FIGS. 19(a) to 19(c) are sequential perspective views from above and one side of the universal protector of FIG. 16 in use being attached to a bicycle element with the direction of looping of the ties being indicated by the arrows.
Figure 19B:
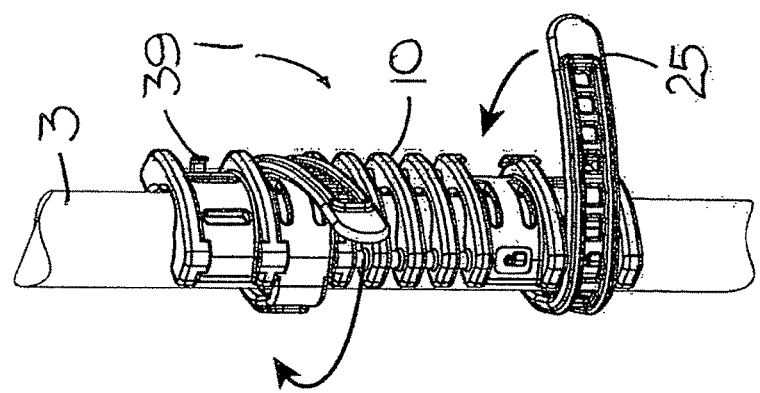
Figure 19A:
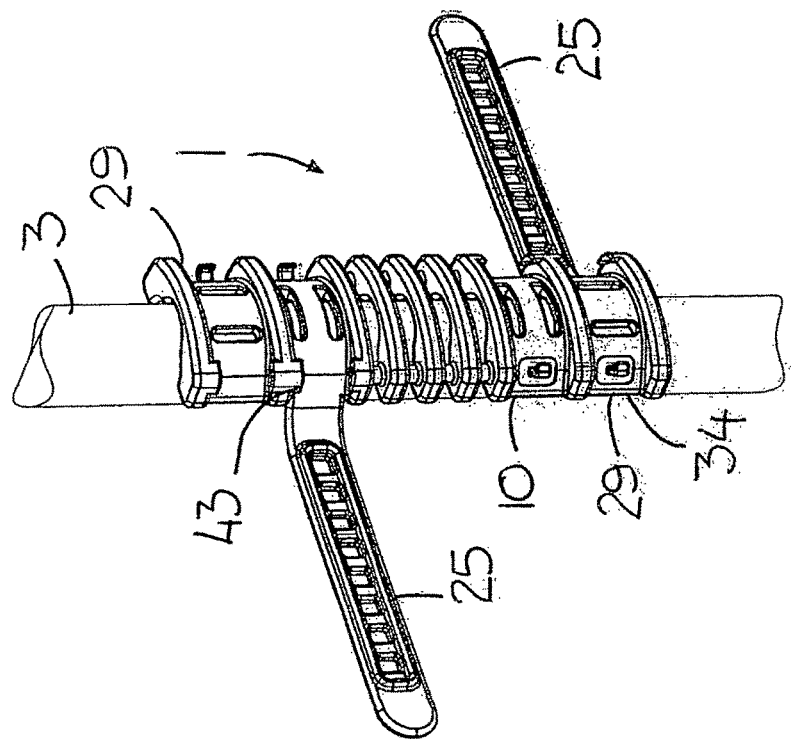
Figures 20, 21:
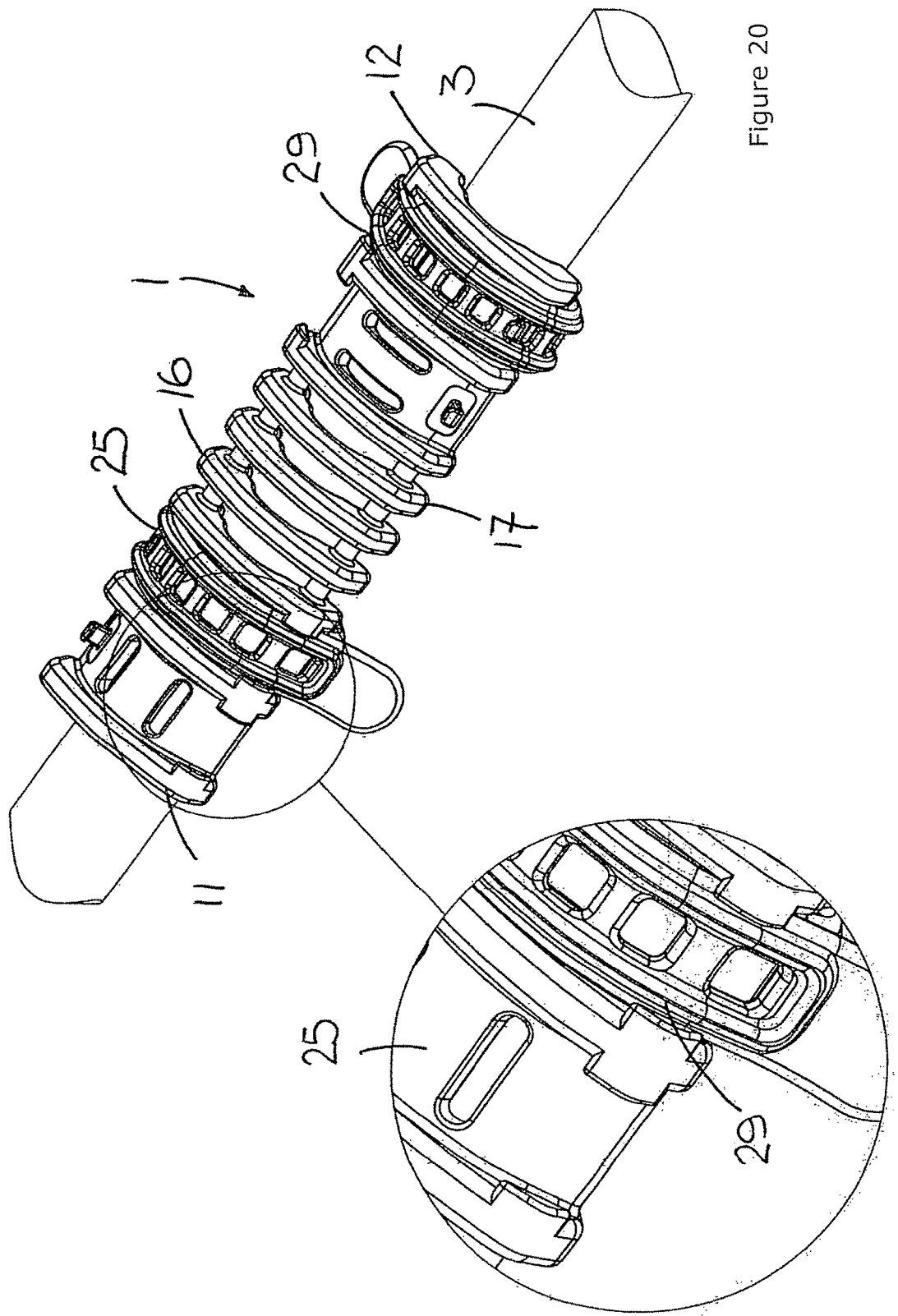
FIG. 20 is an enlarged perspective view from above and one side of the universal protector of FIG. 16 attached to the bicycle element with the free ends of the ties held in place in the groove-like tidy.
FIG. 21 is a further enlarged perspective view from above and one side of the free end of a tie of FIG. 20 held in the groove-like tidy.

In use, the universal protector 1 is simply fastened to the desired profiled element 3,4,5,6,7,8,9 of a bicycle 2 which a user wishes to protect. Moreover, two or more universal protectors can be utilised simultaneously side-by-side in a contiguous manner as required to protect larger profiled elements such as the top tube 4 or the down tube 5 as shown in FIGS. 1 and 4. Moreover, the size adjusting or adapting nature of the groove-like hollow 13 allows the protector 1 to adapt to profiled elements 3,4,5,6,7,8,9 of differing thicknesses (e.g. the top tube 4 vs. pedal 8) while the hinge 18 together with the deformable nature of the shell 10 (and the additional innermost groove 28 where present) allows the universal protector 1 to wrap around differently sized curved or bent profiled elements such as the pedal 8 or handlebar grip 9 as required. Like the groove-like hollow 13, the hinge 18 therefore also serves as a size adjusting or adapting structure to accommodate profiled elements 3,4,5,6,7,8,9 of various sizes in the protector 1. Where present, the tidy 29 can be used to hold the free end of the tie 25 in place as previously described. The universal protector 1 can therefore automatically adapt to the size, shape and conformation of the bicycle elements requiring protection as necessary.

The universal protector 1 can be formed from any suitable resilient deformable plastics material and, if desired, can also be finished with an outer rubberised coating to further protect articles, such as vehicle bodywork, from damage.

The ties 25 can also be formed from any suitable plastics material as required.

If desired, the universal protector 1 can be further adapted to the size of the bicycle elements by cutting the universal protector to size e.g. by transversely cutting the universal protector 1 at the first and/or second end 12,13 respectively as required.

The universal protector of the invention is highly resilient and can be used repeatedly without failing.

The invention claimed is:

1. A universal protector for a bicycle element comprising: a shell for protecting the element, and a fastener for fastening the shell to the element wherein the shell comprises a size adapting and adjusting structure to accommodate the bicycle element, and wherein the fastener comprises a tie comprising a tidy for holding a free end of the tie and the tidy is formed in the shell.

2. A universal protector for a bicycle element as claimed in claim 1 wherein the size adapting and adjusting structure comprises a groove in the shell.

3. A universal protector for a bicycle element as claimed in claim 2 wherein the groove comprises at least a double groove.

4. A universal protector for a bicycle element as claimed in claim 3 wherein the first groove of the double groove comprises a relatively narrower inner groove and the second groove of the double groove comprises a relatively wider outer groove.

5. A universal protector for a bicycle element as claimed in claim 2 wherein the groove comprises a third innermost groove.

6. A universal protector for a bicycle element as claimed in claim 2 wherein the groove comprises a generally C-shaped groove profile in cross-section.

7. A universal protector for a bicycle element as claimed in claim 1 wherein the size adapting and adjusting structure comprises a hinge in the shell.

8. A universal protector for a bicycle element as claimed in claim 7 wherein the hinge comprises a centrally located hinge in the shell.

9. A universal protector for a bicycle element as claimed in claim 8 wherein the hinge is formed by at least one rib in the shell.

10. A universal protector for a bicycle element as claimed in claim 1 wherein the bicycle element is a plurality of bicycle elements and wherein ones of the plurality of bicycle elements are of different sizes and the size adapting and adjusting structure is configured to accommodate the different sized bicycle elements.

11. A universal protector for a bicycle element comprising:
a shell for protecting the bicycle element, and
a fastener for fastening the shell to the element wherein the shell comprises a size adapting and adjusting structure to accommodate the bicycle element, and
wherein the fastener comprises a tie attached to the shell at a latch on the shell and the latch comprises a finger defined on the shell.

12. A universal protector for a bicycle element as claimed in claim 11 wherein the tie is integral with the shell.

13. A universal protector for a bicycle element as claimed in claim 11 wherein the fastener comprises a buckle on the tie engageable with a hook on the shell.

14. A universal protector for a bicycle element as claimed in claim 11 wherein the fastener comprises holes in the tie engageable with a hook on the shell.

15. A universal protector for a bicycle element as claimed in claim 11 wherein the tie further comprises a tidy for holding a free end of the tie.

16. A universal protector for a bicycle element as claimed in claim 11 wherein the bicycle element is a plurality of bicycle elements and wherein ones of the plurality of bicycle elements are of different sizes and the size adapting and adjusting structure is configured to accommodate the different sized bicycle elements.

17. A universal protector for a bicycle element comprising:
a shell for protecting the bicycle element, and
a fastener for fastening the shell to the element wherein the shell comprises a size adapting and adjusting structure to accommodate the bicycle element, and
wherein the fastener comprises a tie comprising a tidy for holding a free end of the tie and the tidy comprises a hold-down fastener for the tie.

18. A universal protector for a bicycle element as claimed in claim 15 wherein the tidy is slidably mounted on the tie.

19. A universal protector for a bicycle element as claimed in claim 15 wherein the tidy is formed in the shell.

20. A universal protector for a bicycle element as claimed in claim 17 wherein the bicycle element is a plurality of bicycle elements and wherein ones of the plurality of bicycle elements are of different sizes and the size adapting and adjusting structure is configured to accommodate the different sized bicycle elements.

* * * * *